United States Patent [19]

Cook

[11] 4,084,602
[45] Apr. 18, 1978

[54] EXPLOSION DISCHARGE VALVE

[75] Inventor: Kenneth C. Cook, Walnut Creek, Calif.

[73] Assignee: Systron-Donner Corporation, Berkeley, Calif.

[21] Appl. No.: 735,159

[22] Filed: Oct. 26, 1976

Related U.S. Application Data

[63] Continuation-in-part of Ser. No. 637,582, Dec. 4, 1975, Pat. No. 4,046,156.

[51] Int. Cl.$^2$ .............................................. F16K 17/40
[52] U.S. Cl. ................................ 137/68 A; 277/167.5; 285/336; 285/351; 285/DIG. 18
[58] Field of Search ....... 285/328, 336, 351, DIG. 18, 285/DIG. 19; 277/180, 167.5, 236; 137/68 A

[56]  References Cited
U.S. PATENT DOCUMENTS

| | | | |
|---|---|---|---|
| 1,951,897 | 3/1934 | Binckley | 220/89 A |
| 2,408,774 | 10/1946 | Goddard et al. | 137/68 A X |
| 2,417,082 | 3/1947 | Mapes et al. | 169/28 |
| 3,208,758 | 9/1965 | Carlson et al. | 285/336 X |
| 3,467,120 | 9/1969 | Hill et al. | 220/89 A X |
| 3,693,691 | 9/1972 | Summers | 137/68 A X |
| 3,762,479 | 10/1973 | Fike et al. | 169/28 |

Primary Examiner—Martin P. Schwadron
Assistant Examiner—Richard Gerard
Attorney, Agent, or Firm—Flehr, Hohbach, Test, Albritton & Herbert

[57] ABSTRACT

Valve apparatus is disclosed for discharging pressurized fire extinguisher fluid from a container. A valve housing includes a valve body and manifold between which a diaphragm which is removably mounted to facilitate field replacement. The diaphragm comprises a semi-spherical shell which is mounted across a passage in the housing with a concave side of the shell facing the pressurized fluid. The shell is fabricated of a metal which is pre-stressed so that the diaphragm ruptures above a predetermined fluid pressure for relieving overpressure from the container. A dual seal is formed about the rim of the diaphragm by means of an O-ring and an annular knife edge which are disposed within a recess of the manifold body. The valve body and manifold are secured together in metal-to-metal contact at their interface to prevent leaking. A squib cartridge is mounted in the housing to rupture the diaphragm and permit the fluid to discharge through the passage. A screen is mounted in the passage to screen out fragments of the ruptured diaphragm from the flow stream.

2 Claims, 4 Drawing Figures

U.S. Patent        April 18, 1978        4,084,602
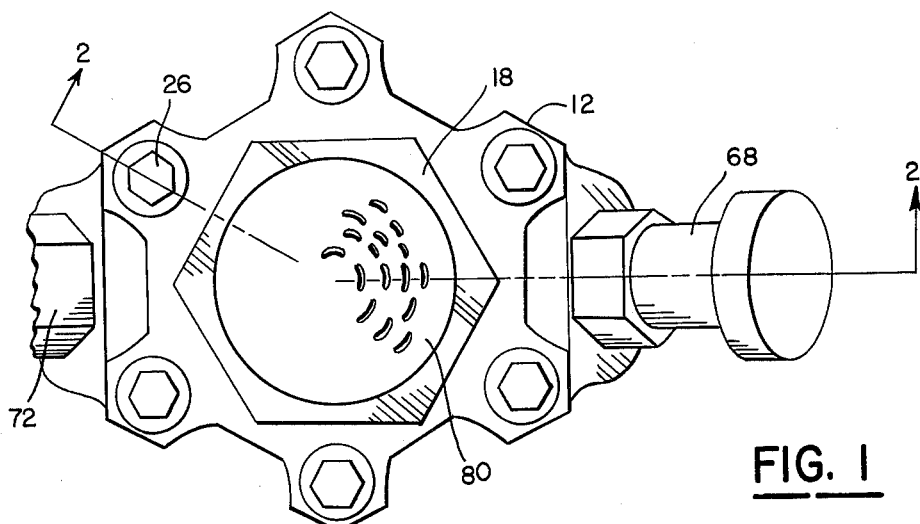
FIG. 1
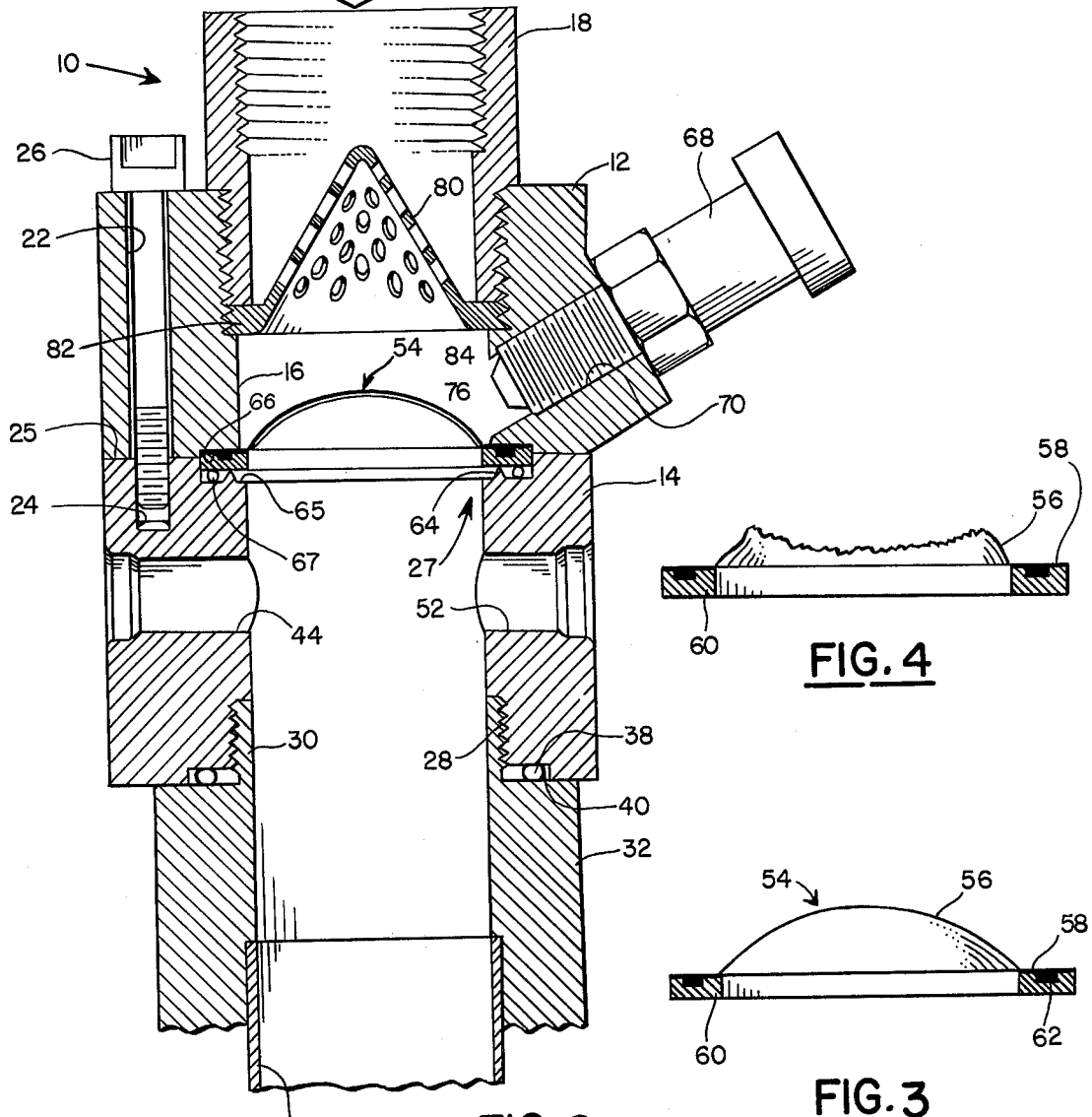
FIG. 2
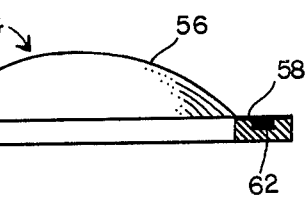
FIG. 4
FIG. 3

EXPLOSION DISCHARGE VALVE

CROSS-REFERENCE TO RELATED APPLICATION

This is a continuation-in-part of application Ser. No. 637,582, filed Dec. 4, 1975, and now U.S. Pat. No. 4,046,156.

BACKGROUND OF THE INVENTION

This invention relates in general to fire extinguisher systems, and more particularly relates to fire extinguisher systems which provide rapid discharge of fire extinguisher fluids hermetically sealed under gas pressure within containers.

Fire extinguisher systems have heretofore been provided in which the contents of pressurized fire extinguisher containers are discharged by rupturing a closure disc to rapidly direct the fire extinguisher fluids to fire zones. Certain of these systems employ a filler port which is sealed after the fire extinguisher fluid is charged into the container, a safety relief valve which ruptures above a predetermined container pressure, and an explosive charge which ruptures a closure disc for discharge. It is conventional in these valves to employ a closure disc which is sealed within the valve by means such as welding.

In fire extinguisher systems of the type described it has not been feasible to recharge the container in the field after operation. It has heretofore been necessary to bring the entire valve back to a shop for removing and replacing the ruptured closure disc and for refilling the container. Moreover, the requirement of providing an over-pressure relief valve in addition to the closure disc in the discharge valve adds to the design complexity and cost of the system. Accordingly, the need has been recognized for a fire extinguisher system which will obviate the disadvantages and limitations of existing systems.

OBJECTS AND SUMMARY OF THE INVENTION

It is a general object of the invention to provide new and improved valve apparatus for discharging pressurized fire extinguisher fluid from a container.

Another object is to provide a valve of the type described which employs a disc which hermetically seals fluid pressure within the container and which at the same time is easily removed to permit field replacement following operation of the valve.

Another object is to provide a valve of the type described which incorporates a closure diaphragm having a metal rim sealed by an annular knife edge which is protected from damage in a recess of the valve manifold.

Another object is to provide a valve of the type described in which a dual seal is formed between the valve body and valve manifold, with the latter components secured together at their interface in metal-to-metal contact to insure integrity of the dual seal and prevent fluid leakage.

The invention in summary includes a housing comprising a valve body and manifold body which are mounted about a semi-spherical shell diaphragm normally occluding a flow passage communicating with pressurized fire extinguisher fluid in a container. The diaphragm is pre-stressed to achieve a predetermined rupture strength limit to function as a safety relief valve for the container. A dual seal is formed about the diaphragm by means of an O-ring and annular knife edge recessed in the manifold to protect the knife edge from damage. A metal-to-metal contact at the interface of the valve body and manifold protects the integrity of the dual seal. A squib cartridge is mounted in the housing to rupture the diaphragm and discharge fluid from the container along the passsage to a fire zone. A screen is mounted in the valve housing downstream of the diaphragm to screen out fragments of the ruptured diaphragm.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is a fragmentary top plan view of the valve apparatus of the invention.

FIG. 2 is an axial section view of the valve of FIG. 1 shown connected with the discharge port of a fire extinguisher container.

FIG. 3 is an axial section view of an intact ruptured diaphragm used in the valve of FIG. 1.

FIG. 4 is a view similar to FIG. 3 showing the diaphragm after rupture.

DESCRIPTION OF THE PREFERRED EMBODIMENTS

In the drawings FIGS. 1 and 2 illustrate generally at 10 a preferred embodiment of the explosion discharge valve of the invention. Valve 10 includes a two-part housing comprising an upper valve body 12 and a lower manifold body 14. Valve body 12 is formed with a generally hexagonal outer configuration and a circular axial bore 16 which is internally threaded at its upper end for connection with an adapter fitting 18. Adapter fitting 18 in turn has an upper hexagonal shoulder for applying a suitable tool or wrench, and the fitting is formed with an axial bore 20 which is internally threaded at its upper end for connection with suitable plumbing, not shown, arranged to direct the fire extinguisher fluid to one or more remote fire zones. A plurality, shown as six, of axially extending openings 22 are formed about the periphery of valve body 12, and an equivalent number of internally threaded holes 24 are formed in the upper end of manifold 14 in register with the openings. Suitable fasteners such as the six cap screws 26 are mounted through openings 22 and engage the threaded holes 24 for securing the valve body and manifold together.

The annular facing surfaces of the valve body and manifold are machined flat so that when tightly assembed together, a rigid metal-to-metal connection is made at their interface 25. This metal-to-metal connection maintains the integrity of a dual seal means 27 which is provided between the valve body and manifold, thereby preventing leakage which could occur due to stress on the valve, e.g., bending stresses during installation of plumbing on the valve.

Valve manifold 14 is formed with an internally threaded opening 28 connected with external threads formed on a stub end 30 of a fire extinguisher container 32, which can be of a suitable configuration such as cylindrical or spherical. A hollow cylindrical dip tube 34 is secured onto the lower end of stub end 30. The lower end of the dip tube is open to admit fluid from the container into the dip tube and manifold. A suitable O-ring seal 38 is mounted within a groove 40 formed about the lower end of the manifold to create an hermetical seal between the manifold and container discharge port.

An opening 44 is formed through one side of manifold 14 for mounting a suitable pressure gauge, not shown, to provide visual indication of pressure within the fire extinguisher container. As desired, the pressure gauge may be replaced by a pressure switch, not shown, which provides pressure indication at a remote location through electrical leads. An opening 52 is formed in an opposite side of the manifold for mounting a suitable one-way valve, not shown, for filling the container with a charge of pressurized fire extinguisher fluid, such as bromochlorodifluoromethane, together with a pressurizing gas such as nitrogen. Typically the contents of the container are maintained under a pressure on the order of 600 p.s.i. As desired, a suitable leak detection gas, such as helium, can be added to the charge in the container.

A dual purpose replaceable diaphragm 54 is mounted between valve body 12 and manifold 14 for normally occluding the discharge flow passage through the valve. Diaphragm 54 includes a generally cup-shaped semi-spherical shell 56 with a flat annular outer rim 58. Preferably the shell is formed of a suitable high tensile strength material such as stainless steel which is prestressed by work hardening the metal so that the diaphragm has a predetermined rupture strength, preferably in the range of 1800 to 2000 p.s.i. In one specific application, given by way of example only, the diaphragm is fabricated from an initially flat disc of CRES 304 metal with a thickness of 0.010 inch. Hydraulic pressure of 1,800 p.s.i. is applied to the center portion of the disc causing it to deform and work harden into the illustrated cup-shaped configuration having a thickness of substantially 0.005 inch.

Diaphragm 54 includes a ring 60 of a suitable ductile metal such as copper. The top side of the copper ring is plated with a suitable material such as nickel or gold for corrosion protection, and the ring is secured to the lower surface of the rim 58 by means such as brazing. The brazing operation can be carried out by placing a suitable brazing material such as EASY-FLO No. 3 sold by Handy Harman Co. into a circular groove 62 formed in the upper side of the ring. The shell and ring are then placed in a furnace and heated so that the brazing material forms a secure bond between the two parts.

Dual seal means 27 includes an inner seal created by an annular knife edge 64 which is formed about the upper end of manifold 14. The knife edge 64 is disposed in an annular recess 65 so that the edge is spaced below the end of the manifold and is protected from damage, such as during assembly or during replacement of the diaphragm. An annular socket 66 formed about the lower end of valve body 12 seats over diaphragm rim 58. The thickness of rim 58 is slightly greater than the clearance between the knife edge and socket 66 so that as cap screws 26 are tightened down the diaphragm is compressed against the manifold. This causes the knife edge to form and seat into a groove in the softer material of ring 60.

Dual seal 27 further includes an elastomeric O-ring 67 which is disposed in recess 65 about the knife edge. When the valve is assembled the O-ring is compressed between the diaphragm rim and recess to create a second fluid-tight seal. The knife edge and O-ring seals act in combination to insure against leakage and loss of pressure from the container, a highly important objective for critical fire extinguisher applications.

Explosive charge means is provided for rupturing diaphragm 54 when required to discharge the fire extinguisher container. This charge means includes a suitable squib cartridge 68 threadably mounted through an opening 70 formed in a side of the valve body. The axis of opening 70 is aligned at an angle on the order of 60° from the center line of the valve flow passage so that explosive discharge from the cartridge impinges upon the lower margin of the convex side of diaphragm. The cartridge 68 is activated by suitable means such as electrical current directed through leads, not shown connected with a temperature sensor in the remote fire zone. An additional squib cartridge 72 is threadably mounted through a opening formed in an opposite side of the valve body, and this cartridge is also aligned at an angle of 60° from the flow passage so that its explosive discharge impacts against the lower margin of the diaphragm. Cartridge 72 is activated remotely by a suitable mechanical firing device, e.g. a manual pull cable, to provide safety override in case of malfunction of the electrically operated cartridge. Each of the squib cartridges includes a metal cap 76 at their lower ends which forms a part of the enclosures for the deflagrating charge material. Upon activation of the cartridges the rapidly exploding gases tear out and impel the metal caps with high force to impact upon and initially rupture the diaphragm. Immediately thereafter the rapidly discharging flow of high pressure fluid through the valve completes the rupture of the entire diaphragm in the manner illustrated in FIG. 4.

A screen structure is mounted in the flow passage downstream of the diaphragm for screening out fragments of the ruptured diaphragm from the discharging fluid. The screen structure comprises a perforated metal cone 80 secured at its base by means such as brazing to a metal ring 82 which in turn is threaded into the bore of the valve body. An intrusive rim 84 is formed about bore 16 of the valve body, and screen ring 82 is sized to seat against the upper surface of this rim. Threading connection of adapter 18 into the valve body tightly captures the ring against the rim to hold the screen in place across the discharge flow path.

The use and operation of the explosive discharge valve is as follows. Valve manifold 14 and its dip tube 34 are threadably connected into the discharge port of the container. O-ring is set into recess 65. The lower surface of diaphragm ring 60 is placed on knife edge 64 and the valve body 12 is then mounted over the diaphragm and tightened down by the cap screws to compress ring 60 against the knife edge and O-ring and thereby form a tight seal about the diaphragm. Adapter 18 is then threaded into the upper end of the valve body and plumbing is connected between the adapter and remote fire zones, such as engine nacelles of an aircraft. The squib cartridges are threadably mounted into the valve body, with the cartridge 68 connected with a temperature sensor in the fire zone and the cartridge 72 connected with a pull cable for manual override. A charge of fire extinguisher fluid and pressurization gas is injected through the fill port valve into the container to a pressure on the order of 600 p.s.i.

When a fire breaks out the remote temperature sensor energizes squib cartridge 68 which fires, directing an explosive charge against the diaphragm. The metal cap from the charge impinges upon and ruptures the lower side of the convex surface of the diaphragm. The rapid discharge of pressurized fluid from the container through the initially ruptured portion of the diaphragm causes complete tearing of the metal shell with the fluid continuing through the valve along the plumbing to the fire zone. Metal fragments from the ruptured disc are screened out from the flow by screen 80. Should an over-pressure condition occur in the container for any reason the pre-stressed diaphragm will rupture outwardly and relieve the pressure through the valve passage.

Following discharge of the container, valve 10 can be reconditioned in the field for further operation by dismounting valve body 12 from the manifold. The ruptured diaphragm is removed and replaced by a new diaphragm, and the valve body is again mounted onto the manifold to seal the new diaphragm in place. The expended squib cartridge is removed and replaced, and an additional charge of fire extinguisher fluid and pressurization gas is injected through the fill port valve into the container.

While the foregoing embodiments are presently considered to be preferred it is understood that numerous variations and modifications may be made therein by those skilled in the art and it is intended to cover in the appended claims all such variations and modifications as fall within the true spirit and scope of the invention.

What is claimed is:

1. A valve for discharging pressurized fire extinguisher fluid from a container, including the combination of a valve housing formed with a flow passage, said housing including a valve body adapted for connection with plumbing for distributing the fluid to a remote zone, a manifold body adapted for connection with said container and communicating with the fluid therein, means forming annular flat surfaces on the facing ends of the respective valve body and manifold body to form metal-to-metal connection at the interface therebetween, means forming an annular recess in said facing end of the manifold body, means forming an annular knife edge in the recess about the passage with the edge pointed toward the valve body, the apex of the edge lying in a plane within the recess and under the plane of the facing end of the manifold body for protecting the knife edge against damage such as during assembly of the valve or during replacement of the diaphragm, a diaphragm in the valve body mounted across the passage for normally occluding flow therethrough, said diaphragm including a peripheral rim which is mounted in the recess, an elastomeric ring disposed in the recess about the knife edge seal with the ring compressed into sealing contact between the diaphragm rim and manifold body when the latter are mounted together by fastener means, and releasable fastener means for mounting the valve body and manifold body together at their interface and for compressing the diaphragm rim into sealing engagement about the knife edge.

2. A valve for discharging pressurized fire extinguisher fluid from a container, including the combination of a valve housing formed with the passage, said housing including a valve body adapted for connection with plumbing for distributing the fluid to a remote zone, a manifold body adapted for connection with the container in communication with the fluid therein, said valve body and manifold body each being formed with flat annular facing end surfaces which are in metal-to-metal contact at their interface when the valve and manifold bodies are assembled together, means forming an annular socket in said flat end of the valve body about the passage, means forming an annular recess in said flat end of the manifold body in register with the socket, means forming an annular knife-edge seal in the recess about the passage, with the edge pointing toward the valve body and lying in a plane spaced inwardly of said interface, a diaphragm mounted in the housing across the passage for occluding fluid flow therethrough, said diaphragm including an annular rim mounted in the socket, wth the thickness of the rim being greater than the clearance between the knife edge seal and socket whereby an interference fit is created when the parts are assembled, an O-ring mounted in the recess about the knife edge between the diaphragm rim and manifold body, and fastener means for securing the valve body and manifold body together at their interface while compressing the diaphragm rim against the knife edge so that the interference fit of the latter forms and seats into a groove in the rim to provide a fluid seal about the passage and also for compressing said O-ring to form another seal about the passage, said fastener means holding the facing ends of the valve and manifold bodies in said metal-to-metal contact for resisting stresses applied to the valve for maintaining the integrity of the seals.

* * * * *